May 8, 1934.  W. P. MITCHELL  1,958,168
COMBINED BUCK AND PLINTH
Filed Aug. 21, 1930
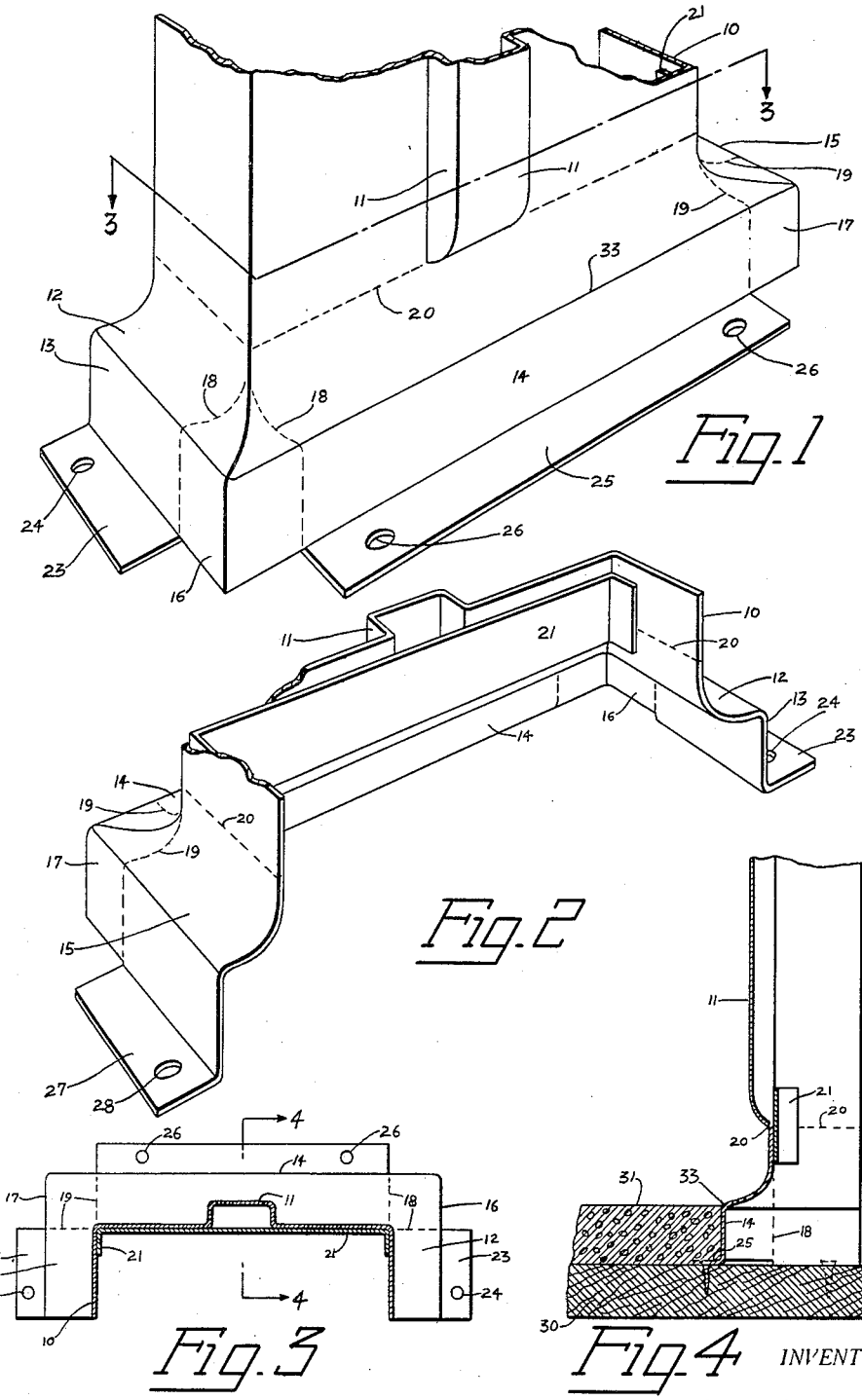
INVENTOR.
WALTER P. MITCHELL
BY
ATTORNEY.

Patented May 8, 1934

1,958,168

UNITED STATES PATENT OFFICE 1,958,168

COMBINED BUCK AND PLINTH

Walter P. Mitchell, Charlotte, N. C.

Application August 21, 1930, Serial No. 476,743

2 Claims. (Cl. 189—46)

This invention relates to an improved building structure and more especially to a structure embodying a buck adapted to stand vertically along the edge of a door and a plinth integral therewith.

Heretofore it has been the custom to secure a buck in place and then to affix thereto a suitable plinth and to secure the same together by screws, braces, and otherwise, thus leaving a seam in close proximity to the floor which acts to catch dust, germs and other foreign matter, and it is an object of my invention to provide a plinth which is integral with the buck so as to thereby eliminate any crevices, cracks and seams into which foreign matter may lodge, and as this is especially desirable in hospitals and other places where the greatest degree of care is exercised to prevent collection of dust and foreign matter in seams, crevices, cracks and other places.

Another object of my invention is to provide a buck having integral therewith on the lower end thereof a plinth, said buck and the complete plinth being in one piece, the parts being preferably made of sheet metal and welded to each other or if desired, the plinth itself may be of drop-forging, cast iron or any suitable material so as to permit the joining of the plinth and the buck together into an integral structure.

Some of the objects of my invention having been stated other objects will appear as the description proceeds, taken in connection with the accompanying drawing in which—

Figure 1 is a perspective view of the lower end of a buck showing my plinth integral therewith;

Figure 2 is a reverse view of Figure 1;

Figure 3 is a cross-sectional view taken along the line 3—3 in Figure 1;

Figure 4 is a cross-sectional view taken along the line 4—4 in Figure 3.

Referring more particularly to the drawing the numeral 10 indicates the lower portion of a buck which has the door-stop 11 integral therewith and the plinth proper indicated by the reference character 12. This plinth is formed of portions 13, 14 and 15 with the corner members 16 and 17 welded in position, the dotted lines 18 indicating the point of welding of member 16 to members 13 and 14 and the dotted lines 19 indicate the point of welding of the member 17 to the members 14 and 15. The dotted line 20 indicates the point where the plinth 12 is welded to the lower end of buck 10. On the inner surface of the junction point of the buck 10 and the plinth 12 a member 21 is secured thereto so as to form a reenforcement for the joint 20 between the plinth and the buck. The member 13 has the laterally projecting portion 23 with a hole 24 therethrough for purposes of securing the plinth to the sub-structure of the floor and the member 14 has a similar portion 25 with holes 26 therein for likewise securing this portion to the sub-structure of the floor while the member 15 has a similar laterally projecting portion 27 with a hole 28 therethrough for likewise securing this part to the sub-structure of the floor.

In Figure 4 I show the manner in which this plinth and buck may be used in which the sub-structure of the floor is indicated by the reference character 30 and the plinth is shown secured in place and concrete or other suitable flooring surface 31 is then placed in position so as to cause the floor level to be at the point designated by the reference character 33 in Figures 1 and 4.

It is thus seen that I have provided a plinth and buck which are integral with each other and which can be manufactured in the factory and shipped to suit individual requirements in any building structure and placed in position and after the floor proper has been laid a dustproof and germ-proof building structure will be provided which is quite an advance in the art.

In the drawing and specification I have set forth a preferred embodiment of my invention and although specific terms are employed they are used in a generic and descriptive sense only, and not for purposes of limitation, the scope of this invention being set forth in the appended claims.

I claim:

1. In an article of the class described, a buck, a plinth having the same overall dimensions at its upper end as the buck with the abutting ends of the buck and plinth being secured to each other by welding, brazing or the like, said plinth having its two ends and its side flared outwardly by being cut at their junction points with filler members welded in position at said junction points.

2. In an article of the class described, a buck, a plinth having the same overall dimensions at its upper end as the buck, the abutting ends of the buck and plinth being secured to each other by welding, brazing and the like, said plinth being of sheet metal and having its ends and side flared outwardly.

WALTER P. MITCHELL.